United States Patent
Yamamoto et al.

[11] Patent Number: 5,771,479
[45] Date of Patent: Jun. 23, 1998

[54] WHEEL DIAMETER DIFFERENCE JUDGING SYSTEM AND WHEEL SPEED CORRECTING SYSTEM

[75] Inventors: Osamu Yamamoto; Shuji Shiraishi, both of Saitama; Osamu Yano, Tochigi, all of Japan

[73] Assignee: Honda Giken Kogyo Kabushiki Kaisha, Tokyo, Japan

[21] Appl. No.: 570,208

[22] Filed: Dec. 11, 1995

[30] Foreign Application Priority Data

Dec. 12, 1994 [JP] Japan .................................. 6-307966

[51] Int. Cl.$^6$ .................................................. G06F 17/00
[52] U.S. Cl. .................... 701/70; 364/565; 364/424.034; 364/426.038; 303/DIG. 7
[58] Field of Search ...................... 364/423.098, 424.034, 364/424.098, 426.016, 426.01, 426.021, 426.038, 565; 180/197; 303/122, 122.01, 122.02, 122.06, DIG. 7

[56] References Cited

U.S. PATENT DOCUMENTS

| | | | |
|---|---|---|---|
| 4,545,623 | 10/1985 | Sato et al. ........................ | 303/122.02 |
| 5,060,747 | 10/1991 | Eto .................................. | 364/424.098 |
| 5,179,526 | 1/1993 | Zimmer et al. ................... | 364/565 |
| 5,200,897 | 4/1993 | Makino et al. ................... | 364/426.021 |
| 5,265,944 | 11/1993 | Gloceri ............................ | 364/426.021 |
| 5,292,184 | 3/1994 | Takata .............................. | 364/426.016 |
| 5,299,131 | 3/1994 | Haas et al. ....................... | 364/426.038 |
| 5,490,070 | 2/1996 | Kiryu et al. ..................... | 180/197 |
| 5,561,415 | 10/1996 | Dieckmann ...................... | 364/424.034 |

*Primary Examiner*—Gary Chin
*Attorney, Agent, or Firm*—Armstrong, Westerman, Hattori, McLeland, & Naughton

[57] ABSTRACT

A wheel diameter judging system and wheel speed correcting system which calculates a driven wheel slip rate, and a driven wheel torque. A variation characteristic of the driven wheel slip rate relative to the variation in driven wheel torque is presumed using the method of least squares. A correction value corresponding to a ratio of the number of revolutions of a follower wheel to the number of revolutions of a driven wheel in a condition in which the driven wheel is not in a slipping state is calculated as an intercept of the driven wheel slip rate at the driving torque equal to zero in a graph of the variation characteristic. The driven wheel speed is corrected by the correction value. The driven wheel speed is corrected by the correction value. Thus, even if the driven wheel is in the slipping state, a difference in diameter between the follower and driven wheels can be accurately judged, and the follower wheel speed or the driven wheel speed can be accurately corrected.

3 Claims, 7 Drawing Sheets

WHEEL DIAMETER DIFFERENCE JUDGING SYSTEM AND WHEEL SPEED CORRECTING SYSTEM

BACKGROUND OF THE INVENTION

1. Field of the Invention

The present invention relates to a wheel diameter difference judging system for judging a difference in diameter between a follower wheel and a driven wheel, and a wheel speed correcting system for correcting a follower wheel speed or a driven wheel speed to compensate for a difference between the follower wheel speed and the driven wheel speed generated due to the difference in diameter.

2. Description of the Related Art

The follower and driven wheel speeds of a vehicle are calculated based on outputs from revolution-number sensors mounted on the follower and driven wheels, respectively. However, there is a problem in that when there is a design difference in diameter between the follower and driven wheels, or when there is a difference in diameter due to the wearing of tires, the follower and driven wheel speeds cannot be accurately obtained by only determining the number of revolutions of the follower wheel as a follower wheel speed and determining the number of revolutions of the driven wheel as a driven wheel speed.

Therefore, it is a conventional practice to determine a ratio of the number of revolutions of the follower wheel to the number of revolutions of the driven wheel, and to correct the follower wheel speed or the driven wheel speed by a correcting value searched from a primary filtered value of this revolution-number ratio.

However, in the conventional technique, when the driven wheel is in a slipping state, it is impossible to correctly determine the ratio of the number of revolutions of the follower wheel to the number of revolutions of the driven wheel. This causes a problem that an error is generated in the difference in diameter between the follower and driven wheel speeds determined based on the revolution-number ratio, or in the follower wheel speed or the driven wheel speed corrected based on the revolution-number ratio.

SUMMARY OF THE INVENTION

Accordingly, it is a first object of the present invention to provide a wheel diameter difference judging system capable of accurately judging a difference in diameter between the follower and driven wheels irrespective of the slipping state of the driven wheel. It is a second object of the present invention to provide a wheel speed correcting system capable of accurately correcting the follower wheel speed or the driven wheel speed to compensate for an error generated due to the diameter difference.

To achieve the first object, according to the present invention, there is provided a wheel diameter difference judging system, comprising a driven wheel slip rate calculating means for calculating a driven wheel slip rate based on a follower wheel speed and a driven wheel speed, a driven wheel torque calculating means for calculating a driven wheel torque based on an engine torque, a driven wheel slip rate presuming means for presuming a variation characteristic of a driven wheel slip rate relative to a driven wheel torque, and a wheel diameter difference judging means for judging a difference in diameter between follower and driven wheels based on the driven wheel slip rate at the time when the driven wheel torque determined from the variation characteristic presumed by the driven wheel slip rate presuming means is equal to 0 (zero).

With the above arrangement, the variation characteristic of the driven wheel slip rate relative to the driven wheel torque is presumed, and a ratio of the number of revolutions of the follower wheel to the number of revolutions of the driven wheel is determined as the driven wheel slip rate at the time when the driven wheel torque in the variation characteristic is equal to 0. Therefore, the difference in diameter between the follower and driven wheels can be accurately judged without the influence of the slipping state of the driven wheel.

To achieve the second object, according to the present invention, there is provided a wheel speed correcting system comprising a wheel diameter difference judging system of the above-described type, the wheel speed correcting system further including a correcting means for correcting the follower wheel speed or the driven wheel speed based on a driven wheel slip rate at the time when the driven wheel torque determined in the wheel diameter difference judging system is equal to 0 (zero).

With the above arrangement, it is possible to determine correct follower and driven wheel speeds which are not influenced by the difference in diameter between the follower and driven wheels and the slipping state of the driven wheel.

In this case, it is possible for driven wheel slip rate presuming means to correctly presume the variation characteristic of the driving slip rate relative to the driven wheel torque by gaining data for presuming the variation characteristic of the driving slip rate relative to the driven wheel torque in each of a plurality of torque ranges demarcated in accordance with the magnitude of the driven wheel torque, and gaining a larger amount of data in the torque ranges, including the driven wheel torque equal to 0, than that of data in the other torque ranges, and to enhance the accuracy in determining the driven wheel slip rate in a condition in which the driven wheel torque is equal to 0.

The above and other objects, features and advantages of the invention will become apparent from the following description of a preferred embodiment taken in conjunction with the accompanying drawings.

DESCRIPTION OF THE PREFERRED EMBODIMENTS

Figure 1:
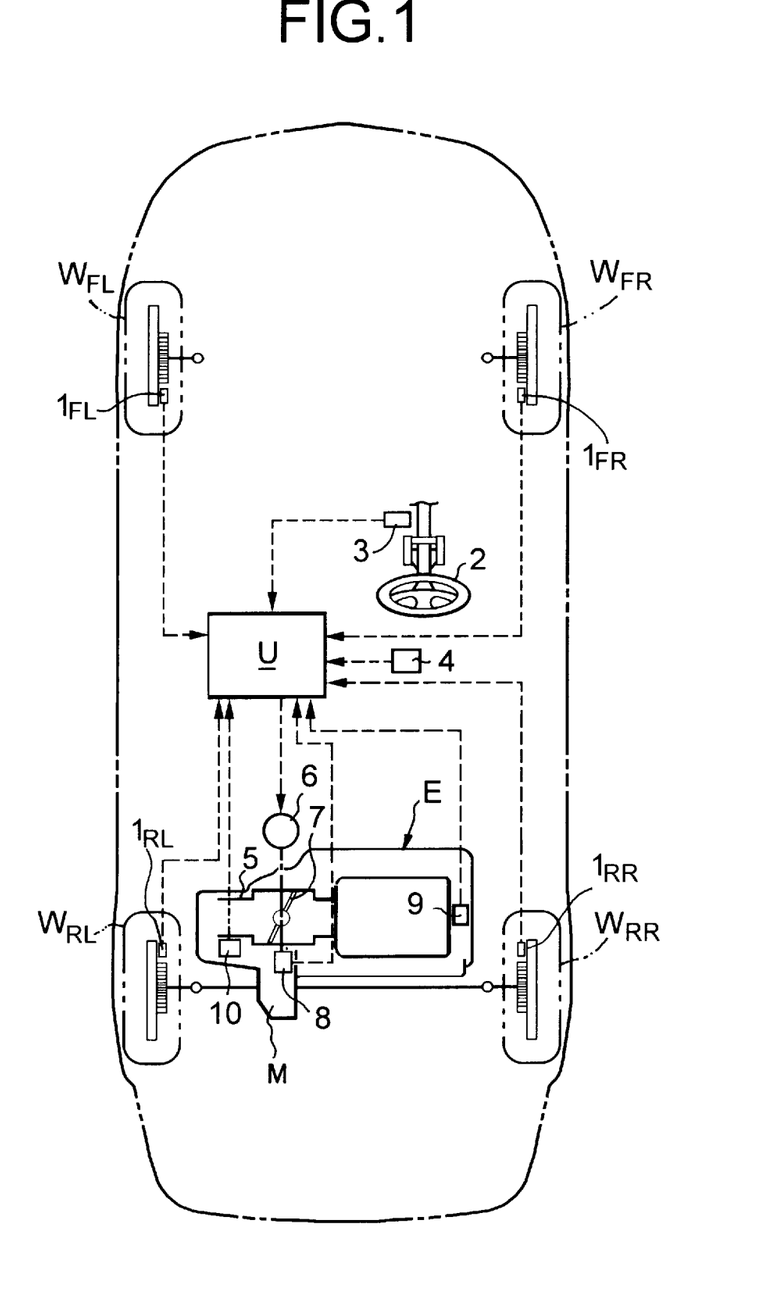
FIG. 1 is a schematic diagrammatic illustration of the arrangement of a vehicle including a traction control system, to which one embodiment of the present invention is applied.

Referring to FIG. 1, there is shown a vehicle which is a rear wheel drive vehicle and includes a pair of left and right driven wheels $W_{RL}$ and $W_{RR}$ driven by an engine E, and a pair of left and right follower wheels $W_{FL}$ and $W_{FL}$ which are steerable. Driven wheel speed detecting means $1_{RL}$ and $1_{RR}$ are mounted on the driven wheels $W_{RL}$ and $W_{RR}$, respectively, and follower wheel speed detecting means $1_{FL}$ and $1_{FR}$ are mounted on the follower wheels $W_{FL}$ and $W_{FR}$, respectively.

A steering angle detecting means 3 for detecting a steering angle δ is mounted on a steering wheel 2, and a lateral acceleration detecting means 4 for detecting a lateral acceleration LG is mounted in place on a vehicle body. A throttle valve 7 is mounted in an intake passage 5 of the engine E and connected to and driven by a pulse motor 6. The opening degree θTH of the throttle valve 7 is detected by a throttle opening degree detecting means 8. An engine revolution number detecting means 9 for detecting the number Ne of revolutions of the engine is mounted in the engine E, and a shift position detecting means 10 for detecting a shift position SP is mounted in a transmission M.

The driven wheel speed detecting means $1_{RL}$ and $1_{RR}$, the follower wheel speed detecting means $1_{FL}$ and $1_{FR}$, the steering angle detecting means 3, the lateral acceleration detecting means 4, the pulse motor 6, the throttle opening degree detecting means 8, the engine revolution number detecting means 9 and the shift position detecting means 10 are connected to an electronic control unit U which includes a microcomputer.

Figure 2:
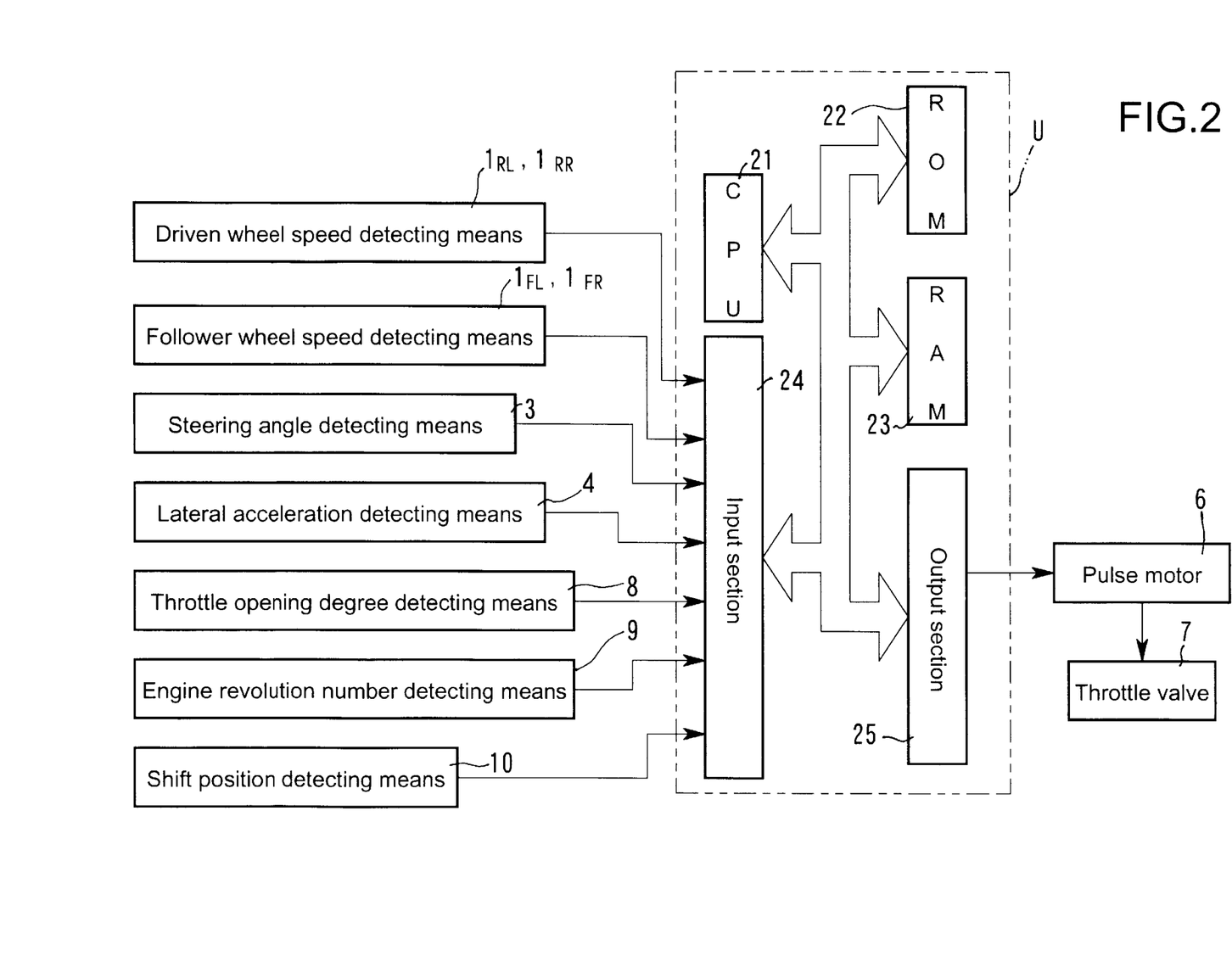
FIG. 2 is a block diagram of a control system.

FIG. 2 shows the electronic control unit U for controlling the output from the engine E by arithmetically processing signals from the detecting means based on a control program and driving the throttle valve 7 by the pulse motor 6, so that when an excessive slip of the driven wheels $W_{RL}$ and $W_{RR}$ has been detected, such excessive slip is inhibited. The electronic control unit U includes a central processing unit (CPU) 21 for conducting the arithmetic processing, a read-only memory (ROM) 22 having the control program and data such as various maps stored therein, a random-access memory (RAM) for temporarily storing the signals from the detecting means and arithmetic results, an input section 24 to which the various detecting means, i.e., the driven wheel speed detecting means $1_{RL}$ and $1_{RR}$, the follower wheel speed detecting means $1_{FL}$ and $1_{FR}$, the steering angle detecting means 3, the lateral acceleration detecting means 4, the throttle opening degree detecting means 8, the engine revolution number detecting means 9 and the shift position detecting means 10 are connected, and an output section 25 to which the pulse motor 6 is connected. Thus, the electronic control unit U arithmetically processes the various signals received through the input section 14, the data stored in the read-only memory 22 and the like, based on a control program which will be described hereinafter by the central processing unit 21, and finally drives the pulse motor 6 through the output section 25. This causes the throttle valve 7 to be controlled to change the output from the engine, thereby inhibiting the excessive slip of the driven wheels $W_{RL}$ and $W_{RR}$.

Figure 3:
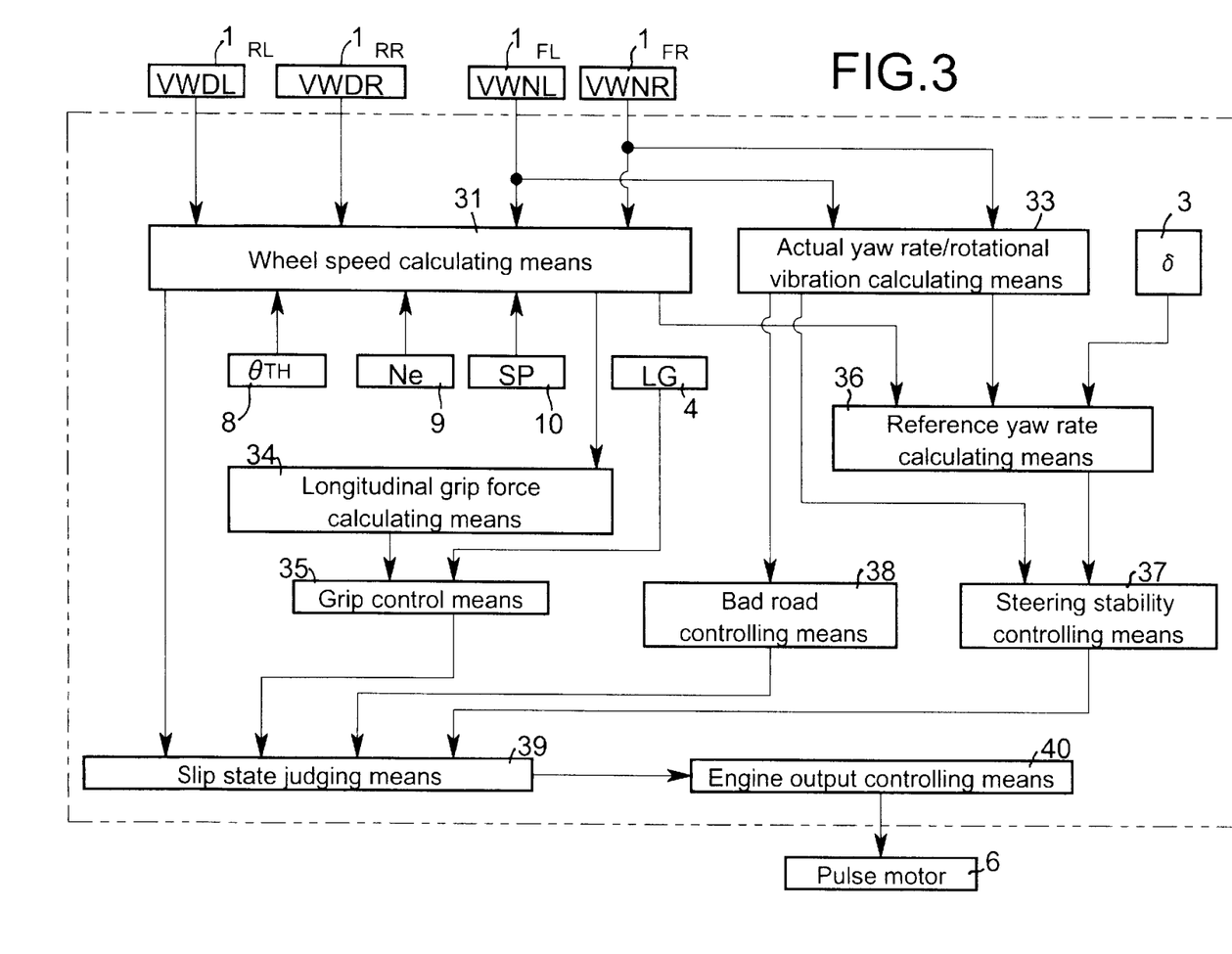
FIG. 3 is a block diagram illustrating a circuit arrangement of an electronic control unit.

The outline of a traction control system will be described below with reference to FIG. 3.

Output signals VWDL and VWDR from the left and right driven wheel speed detecting means $1_{RL}$ and $1_{RR}$, respectively, are supplied to the wheel speed calculating means 31, where a driven wheel speed VW is determined as an average value of the output signals VWDL and VWDR from the left and right driven wheel speed detecting means $1_{RL}$ and $1_{RR}$, respectively, and a value resulting from the correction (which will be described hereinafter) of the driven wheel speed VW is determined as a driven wheel speed VW'. Output signals VWNL and VWNR from the left and right follower wheel speed detecting means $1_{FL}$ and $1_{FR}$ are also supplied to the wheel speed calculating means 31, where a follower wheel speed VV is determined as an average value of the output signals VWNL and VWNR from the left and right follower wheel speed detecting means $1_{FL}$ and $1_{FR}$. This follower wheel speed VV is defined as a vehicle speed VVN. The output signals VWNL and VWNR from the left and right follower wheel speed detecting means $1_{FL}$ and $1_{FR}$ are supplied to the actual yaw rate/rotational vibration value calculating means 33, where an actual yaw rate Y and a rotational vibration value ΔV are determined based on a follower wheel speed difference which is a deviation between the output signals VWNL and VWNR from the left and right follower wheel speed detecting means $1_{FL}$ and $1_{FR}$.

The vehicle speed VVN determined in the wheel speed calculating means 31 is inputted to the longitudinal grip force calculating means 34, where a longitudinal grip force FG is calculated as a time-differentiation value of the vehicle speed VVN.

The longitudinal grip force FG delivered by the longitudinal grip force calculating means 34 and a lateral acceleration LG of the vehicle delivered by the lateral acceleration detecting means 4 are supplied to the grip control means 35, where a total grip force TG is determined as a vector sum of the longitudinal grip force FG and the lateral acceleration LG.

A steering angle δ delivered by the steering angle detecting means 3 and the vehicle speed VVN delivered by the wheel speed calculating means 31 are supplied to the reference yaw rate calculating means 36, where a reference yaw rate $Y_{REF}$, which is a yaw rate to be intrinsically generated by the vehicle in accordance with the operational state, is determined. The reference yaw rate $Y_{REF}$ delivered by the reference yaw rate calculating means 36 and the actual yaw rate Y delivered by the actual yaw rate/rotational vibration value calculating means 33 are supplied to the steering stability control means 37, where it is judged whether the vehicle is in an over-steered state or in an under-steered state.

A rotational vibration value ΔV delivered by the actual yaw rate/rotational vibration value calculating means 33 is supplied to the bad road control means 38, where it is judged based on the magnitude of the rotational vibration value whether a road on which the vehicle is now traveling is a bad road.

The driven wheel speed VW' and the vehicle speed VVN delivered by the wheel speed calculating means 31 are supplied to the slip state judging means 39, where a slip rate for the driven wheel $W_{RL}$ and $W_{RR}$ calculated from the driven wheel speed VW' and the vehicle speed VVN is compared with a reference value determined from the vehicle speed VVN and in accordance with the result of the comparison, the throttle valve 7 is driven by the pulse motor 6 to control the output from the engine E.

In this case, the reference value VR is corrected in accordance with the total grip force TG delivered by the grip control means 35, the steered state delivered by the steering stability control means 37, and the road surface condition delivered by the bad road control means 38.

More specifically, when the total grip force TG is large, the reference value VR is corrected to a large value, whereby a sporty travel is possible without damaging of a slip control function for the driven wheels $W_{RL}$ and $W_{RR}$. Even in the case of a bad road where it is difficult to slip the driven wheels, the reference value VR is corrected to a large value.

The output from the engine is decreased by driving the pulse motor 6 by an engine output control means 40 based on the reference value VR delivered from the slip state judging means 39 to regulate the opening degree of the throttle valve 7. As a result, the slip rate of the driven wheels $W_{RL}$ and $W_{RR}$ is converged to a predetermined value, thereby inhibiting excessive slippage of the driven wheels $W_{RL}$ and $W_{RR}$.

Figure 4:
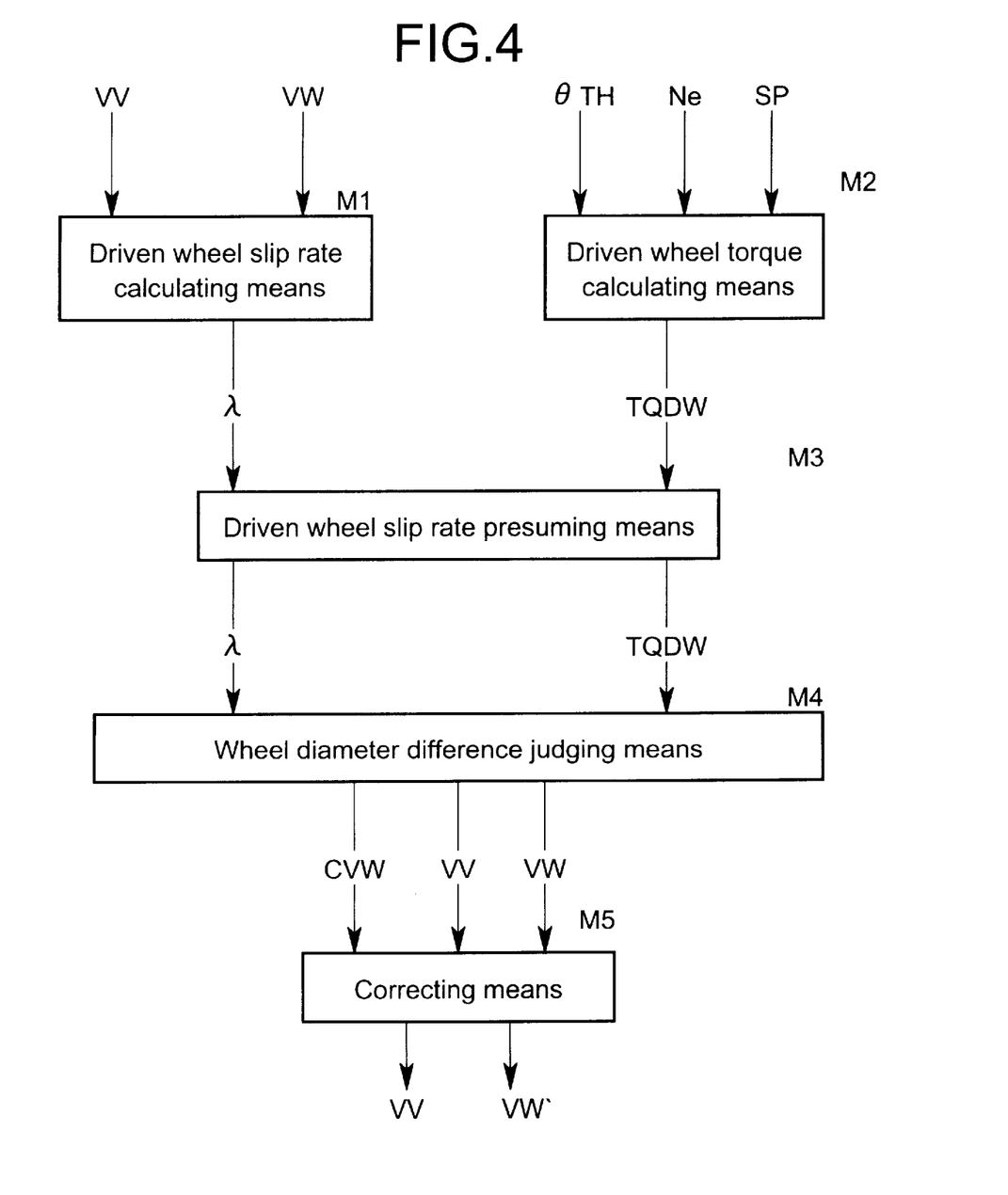
FIG. 4 is a block diagram of a wheel speed calculating means.
Figure 5:
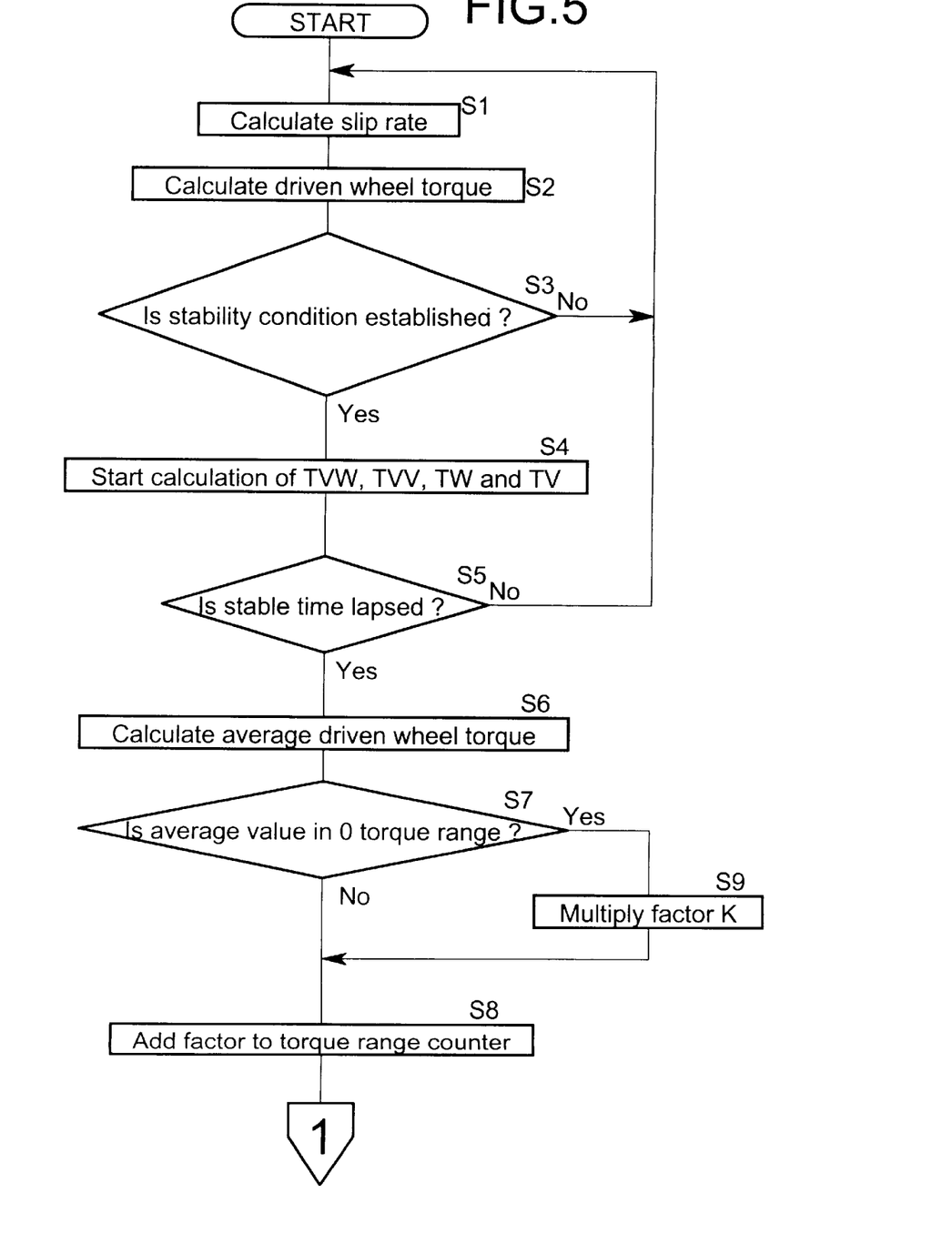
FIG. 5 is a first portion of a flow chart for calculating wheel speeds.
Figure 6:
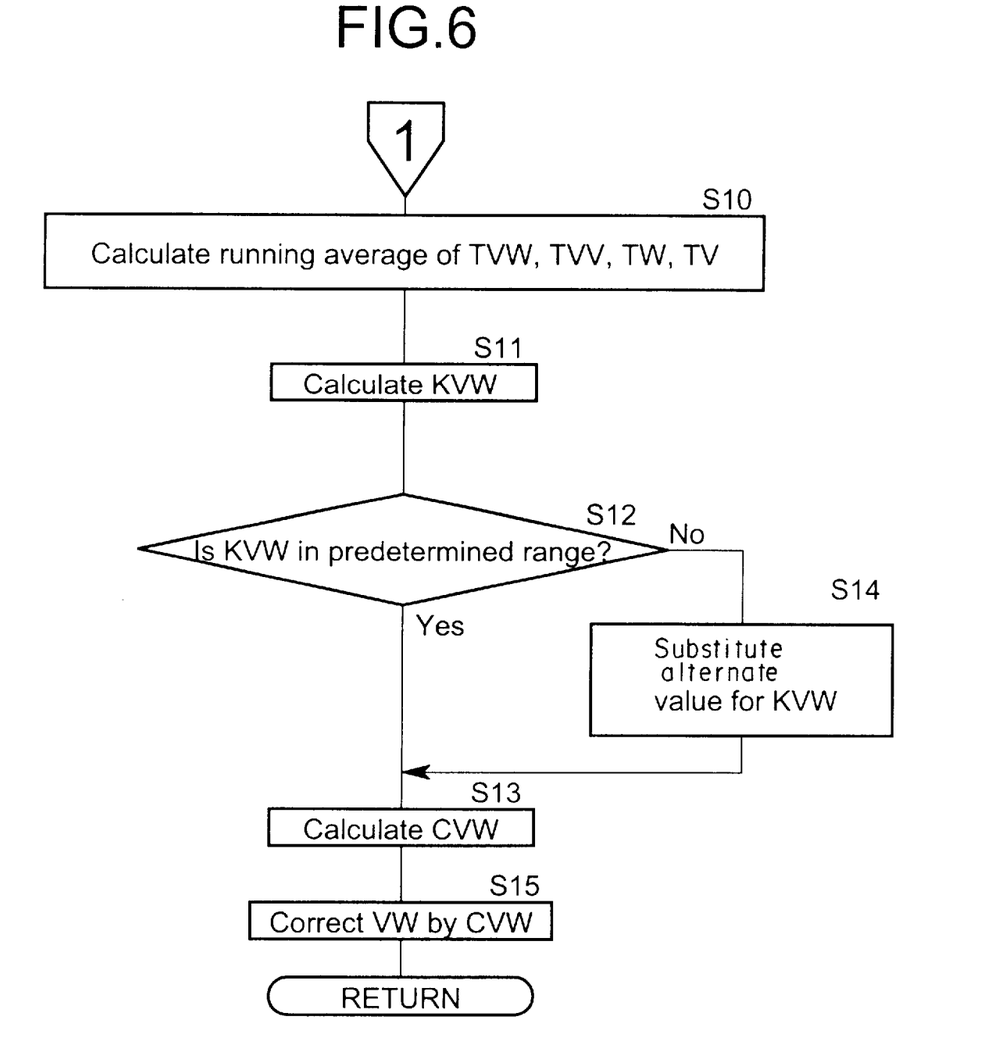
FIG. 6 is a second portion of the flow chart for calculating wheel speeds.

That calculation of the driven wheel speed VW' resulting from the correction, which is carried out in the vehicle speed calculating means 31, will be described below with reference to a block diagram in FIG. 4, a flow chart in FIGS. 5 and 6 and a graph in FIG. 7.

First, in a driven wheel slip rate calculating means M1, a slip rate $\lambda [\lambda =(VW-VV)/VV)]$ of the driven wheels $W_{RL}$ and $W_{RR}$ is calculated based on the driven wheel speed VW which is the average value of the left and right driven wheel speeds VWDL and VWDR and the follower wheel speed W which is the average value of the left and right follower wheel speed VWNL and VWNR (at step S1).

Then, in a driven wheel torque calculating means M2, a driven wheel torque TQDW is calculated by determining an engine torque from the opening degree θTH of the throttle valve 7 detected by the throttle opening degree detecting means 8 and the engine revolution number detected by the engine revolution-number detecting means 9, and multiplying a gear ratio in a shift position detected by the shift position detecting means 10 to a primary filtered value of the engine torque (at step S2). The driven wheel torque TQDW may assume a negative value during action of an engine brake or the like.

Next, in a driven wheel slip rate presuming means M3, it is judged whether the following stability conditions for effecting the correction of the driven wheel speed VW are established (at step S3). More specifically, it is judged whether any of the four wheel speeds VWDL, VWDR, VWNL and VWNR are within a predetermined range, whether any of an amount of variation in driven wheel speed VW and an amount of variation in follower wheel speed VV within a predetermined time are within a predetermined range, whether the longitudinal acceleration FG is within a predetermined range, whether a road on which the vehicle is traveling is not a bad road, whether a brake is not in operation, whether a traction control is not being conducted, whether a variation rate of the steering angle δ is within a predetermined range, whether the lateral acceleration LG is within a predetermined range, and whether the engine revolution number Ne is within a predetermined range. If all these conditions are established, it is decided that the vehicle is in a stable traveling stage, and the correction of the driven wheel speed VW is carried out.

Then, the driven wheel torque TQDW and the driven wheel slip rate λ calculated in every loop are added sequentially according to the following equations (1) to (4), until a stable time (a time for which an n loop is carried out) lapses (at steps S4 and S5):

$$TVW(n)=TQDW(1)\cdot\lambda(1)+TQDW(2)\cdot\lambda(2)+\cdots+TQDW(n)\cdot\lambda(n) \quad (1)$$

$$TVV(n)=TQDW(1)^2+TQDW(2)^2+\cdots+TQDW(n)^2 \quad (2)$$

$$TW(n)=\lambda(1)+\lambda(2)+\cdots+\lambda(n) \quad (3)$$

$$TV(n)=TQDW(1)+TQDW(2)+\cdots+TQDW(n) \quad (4)$$

Then, a value resulting from the addition of the driven wheel torques TQDW(i) according to the equation (4) is divided by n to provide an average value of the driven wheel torques TQDW(i) (at step S6).

The average value of the driven wheel torques TQDW(i) is classified, for example, into any of five ranges (1), (2), (3), (4) and (5) depending upon the magnitude of such average value. The range (1) is a minimum torque range (a negative value); the range (5) is a maximum torque range (a positive value), and the range (2) is a 0 (zero) torque range (in a range in which the driven wheel torque is near zero). A corresponding counter is provided in each of the five ranges (1), (2), (3), (4) and (5).

If the average value of the driven wheel torques TQDW calculated at step S6 does not fall into the 0 torque range (2), 1 is added to the range (1), (3), (4) or (5) into which the average value falls (at steps S7 and S8). On the other hand, if the average value of the driven wheel torques TQDW(i) calculated at step S6 falls into the 0 torque range (2), a factor K (K<1) is counted in the counter for the 0 torque range (2). For example, when K=0, 0.1 is added to the counter for the 0 torque range (2).

Subsequently, a running average of the four addition values TVW, TVV, TW and TV is calculated according to the following equation (5) (at step S10):

$$T?(m)=(1/m)\cdot T?+(m-1/m)\cdot T?(m-1) \quad (5)$$

wherein T?=TVW, TVV, TW, TV.

Thus, the running average of the four addition values TVW, TVV, TW and TV is calculated in each of the five ranges (1), (2), (3), (4) and (5), but when a counter value in each of the ranges (1), (2), (3), (4) and (5) becomes 1, the calculation of the four addition values TVW, TW, TW and TV and the running average thereof in the ranges (1), (2), (3), (4) and (5) is stopped. That is, in the ranges (1), (3), (4) and (5) other than the zero range (2), the gaining of data is conducted for one period of stable time, and in the zero range (2), the gaining of data is conducted for a plurality of periods of stable times depending upon the factor K (for example, if K=0.1, 10 periods).

Then, in a wheel diameter difference judging means M4, a gradient KVW is calculated according to the equation (6) based on the running average of the four addition values TVW, TVV, TW and TV (at step S11):

$$KVW=\{n\cdot TVW-TW\cdot TV\}/\{n\cdot TVV-TV^2\} \quad (6).$$

Specifically, if a characteristic curve providing a probably most accurate relation of the variation in slip rate λ to the variation in driven wheel torque TQDW is presumed using the method of least squares (see FIG. 7), the gradient KVW corresponds to a gradient of the characteristic curve at the driven wheel torque TQDW equal to 0 (zero).

Figure 7:
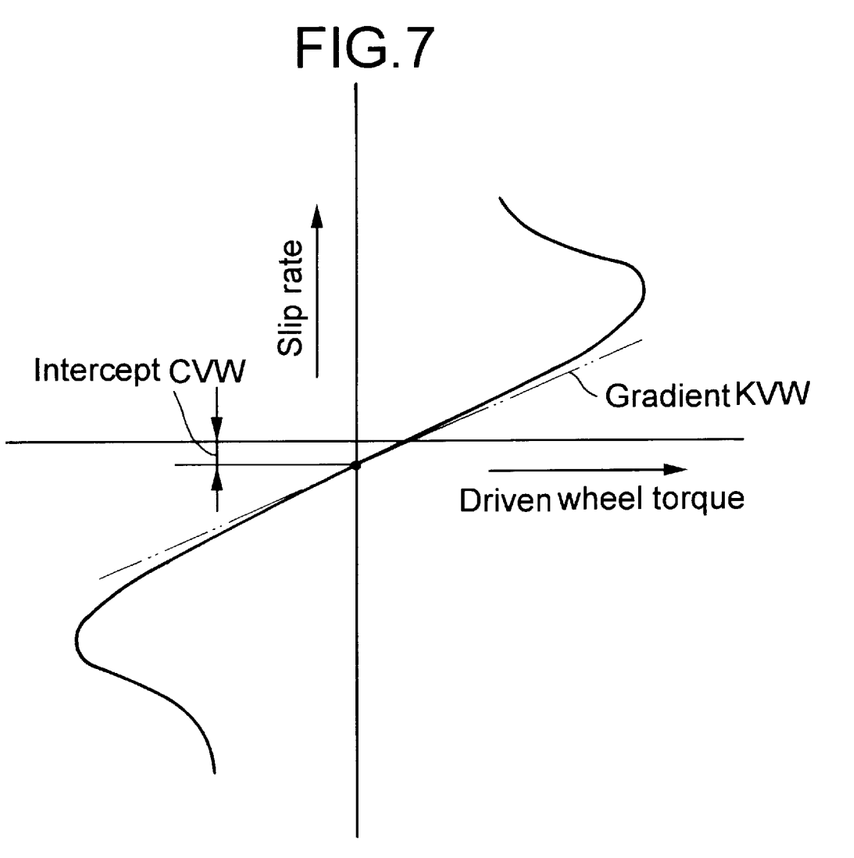
FIG. 7 is a graph illustrating a variation characteristic of driven wheel slip rate.

Referring to FIG. 7, when the gradient KVW is in a predetermined range, an intercept CVW corresponding to a distance between the origin of the coordinate axes and an intersection between the characteristic curve and the axis of ordinates is calculated according to the following equation (7) (at steps S12 to S14):

$$CVW=(TW-KVW\cdot TV)/n \quad (7).$$

This intercept CVW represents a ratio of the number of revolutions of the driven wheels $W_{RL}$ and $W_{RR}$ to the number of revolutions of the follower wheels $W_{FL}$ and $W_{FR}$ at the time when the driven wheels $W_{RL}$ and $W_{RR}$ are not in slipping state. The value of this ratio is nothing but an inverse number of a ratio of the diameter of the driven wheels $W_{RL}$ and $W_{RR}$ to the diameter of the follower wheels $W_{FL}$ and $W_{FR}$.

Then, in a correcting means M5, the driven wheel speed VW is corrected in the following manner based on the intercept CVW. More specifically, in this embodiment, the slip rate $\lambda$ is defined as $\lambda=(VW-VV)/VV)$, and hence, the correction value VW' of the driven wheel speed VW is corrected according to the following equation (8) using the intercept CVW:

$$VW'=VW/(CVW+1) \qquad (8).$$

In this manner, the driven wheel speed VW' is determined by calculating the intercept CVW which is a ratio of the revolution number of the driven wheels $W_{RL}$ and $W_{RR}$ to the revolution number of the follower wheels $W_{FL}$ and $W_{FR}$ at the time when the driven wheels $W_{RL}$ and $W_{RR}$ are not in slipping state, and correcting the driven wheel speed VW by the intercept CVW on the basis of the follower wheel speed VV. Therefore, the follower wheel speed vv and the corrected driven wheel speed VW' are not influenced by the difference between the diameters of the driven wheels $W_{RL}$ and $W_{RR}$ and the follower wheels WFL and WR and the slipping state of the driven wheels $W_{RL}$ and $W_{RR}$. Thus, a precise traction control can be carried out by using the follower wheel speed VV and the corrected driven wheel speed VW'.

Although the embodiment of the present invention has been described in detail, it will be understood that the present invention is not limited to the above-described embodiment, and various modifications in design may be made without departing from the spirit and scope of the invention defined in the claims.

For example, when the driven wheel speed VW is used as a basis in the embodiment, the follower wheel speed VV may be corrected according to the following equation:

$$VV'=VV/(CVW+1).$$

When the slip rate X is defined as being represented by $\lambda=(VW-VV)/VW$, the driven wheel speed VW may be corrected by the equation, $$VW'=VW \cdot (1-CVW)$$

or the follower wheel speed VV may be corrected by the equation, $$VV'=VV/(1-CVW).$$

When the slip rate $\lambda$ is defined as being represented by $\lambda=VW/VV$, the driven wheel speed VW may be corrected by the equation, $$VW'=VW/CVW$$

or the follower wheel speed VV may be corrected by the equation, $$VV'=VV \cdot CVW.$$

When the slip rate X is defined as being represented by $\lambda=VV/VW$, the driven wheel speed VW may be corrected by the equation, $$VW'=VW \cdot CVW$$

or the follower wheel speed VV may be corrected by the equation, $$VV'=VV/CVW.$$

Further, the average value of the left and right follower wheel speeds VWNL and VWNR is used as the follower wheel speed, and the average value of the left and right driven wheel speeds VWDL and VWDR is used as the driven wheel speed in the embodiment, but the intercept CVW can be determined by a combination of the left follower wheel speed VWNL and driven wheel speed VWDL or a combination of the right follower wheel speed VWNR and driven wheel speed VWDR, thereby independently judging differences in diameter between the left and right wheels and/or independently correcting the left and right wheel speeds.

What is claimed is:

1. A wheel diameter difference judging system, comprising:

a driven wheel slip rate calculating means for calculating a driven wheel slip rate based on a follower wheel speed and a driven wheel speed;

a driven wheel torque calculating means for calculating a driven wheel torque based on an engine torque;

a driven wheel slip rate presuming means for estimating a variation characteristic relationship of the driven wheel slip rate relative to the driven wheel torque; and a wheel diameter difference judging means for judging a difference in diameter between follower and driven wheels based on the driven wheel slip rate when the driven wheel torque is equal to 0 (zero) in said variation characteristic relationship estimated by said driven wheel slip rate presuming means.

2. A wheel speed correcting system, comprising:

a driven wheel slip rate calculating means for calculating a driven wheel slip rate based on a follower wheel speed and a driven wheel speed:

a driven wheel torque calculating means for calculating a driven wheel torque based on an engine torque:

a driven wheel slip rate presuming means for estimating a variation characteristic relationship of the driven wheel slip rate relative to the driven wheel torque:

a wheel diameter difference judging means for judging a difference in diameter between follower and driven wheels based on the driven wheel slip rate when the driven wheel torque is equal to 0 (zero) in said variation characteristic relationship estimated by said driven wheel slip rate presuming means, and a correcting means for correcting one of the follower wheel speed and the driven wheel speed based on the driven wheel slip rate at the time when the driven wheel torque is equal to 0 (zero).

3. A wheel speed correcting system according to claim 2, wherein for each of a plurality of torque ranges demarcated in accordance with the magnitude of the driven wheel torque, said driven wheel slip rate presuming means gains data for estimating said variation characteristic relationship of the driven wheel slip rate relative to the driven wheel torque, and gains a larger amount of data in the torque ranges including the driven wheel torque equal to 0 than that of data in the other torque ranges.

* * * * *